United States Patent [19]

Vollmer

[11] Patent Number: 4,732,050

[45] Date of Patent: Mar. 22, 1988

[54] RECEIVING ARRANGEMENT FOR A STEERING COLUMN OF A MOTOR VEHICLE

[75] Inventor: Meinrad Vollmer, Waiblingen, Fed. Rep. of Germany

[73] Assignee: Daimler-Benz Aktiengesellschaft, Stuttgart, Fed. Rep. of Germany

[21] Appl. No.: 56,888

[22] Filed: Jun. 3, 1987

[30] Foreign Application Priority Data

Jun. 6, 1986 [DE] Fed. Rep. of Germany ....... 3619125

[51] Int. Cl.$^4$ ............................................. B62D 1/18
[52] U.S. Cl. ...................................... 74/493; 74/527; 280/775
[58] Field of Search .................. 74/493, 527; 280/775; 248/287

[56] References Cited

U.S. PATENT DOCUMENTS

| | | | |
|---|---|---|---|
| 2,583,260 | 1/1952 | Felix | 248/287 X |
| 3,412,629 | 11/1968 | Hill | 74/493 |
| 4,244,237 | 1/1981 | Sprunger | 74/493 |
| 4,472,982 | 9/1984 | Nishikawa | 74/493 |
| 4,507,982 | 4/1985 | Turner et al. | 74/493 |
| 4,541,298 | 9/1985 | Strutt | 74/493 |

FOREIGN PATENT DOCUMENTS 3300268 7/1983 Fed. Rep. of Germany.
436441 9/1935 United Kingdom ................ 280/775

*Primary Examiner*—Allan D. Herrmann
*Attorney, Agent, or Firm*—Barnes & Thornburg

[57] ABSTRACT

A receiving arrangement for a steering column that can be adjusted in its height and inclination comprises two receiving plates fixed at the vehicle, one locking plate respectively having an oblong hole being assigned to each receiving plate via a plane toothing, a bearing shaft supporting the steering column being guided through said oblong hole into one of two directions that extend vertically with respect to one another, while the opposite locking plate is slid along its receiving plate and by means of its toothing, is locked by means of a clamping arrangement.

4 Claims, 2 Drawing Figures

RECEIVING ARRANGEMENT FOR A STEERING COLUMN OF A MOTOR VEHICLE

BACKGROUND AND SUMMARY OF THE INVENTION

The invention relates to a receiving arrangement for a steering column of a motor vehicle of the type facilitating adjustment of the position of the steering column position.

In German Patent (DE-PS) No. 33 00 268, a receiving arrangement for a steering column is described, where the steering column can be adjusted along rack and pinion arrangements on both sides of the column in two directions that extend perpendicularly to one another. In addition, the pinions are also toothed at their end face so that, by means of a form-fitting engagement with the opposite pinion, in the case of the locking of the steering column by means of a clamping device, a sufficient resistance exists against a further sliding. In a very costly way, these load transmission pinions must therefore be developed with circumferential and end toothing. Since a tilting of the sliding arrangement cannot be accepted, the racks, pinions and guide means, in the case of this type of construction, are in each case required on both sides making the receiving arrangement much more costly.

It is therefore an objective of the invention to dispose a steering column in a simply constructed receiving arrangement so that it can be adjusted with respect to height and inclination and can be securely locked in its adjusted position.

This objective is achieved according to preferred embodiments by providing receiving plates fixed to the vehicle at opposite sides of the steering column and locking plates with oblong holes for permitting movement of a steering column bearing shaft, the receiving and locking plates having respective interengageable toothed sections for locking the same together in adjusted positions. The receiving plates include central openings to facilitate the desired adjusting movement of the steering column bearing shaft.

The guide surfaces and locking means at the receiving and locking plates, opposite the guide through the direction-indicating oblong hole, ensure a clear adjusting movement and a stable holding of the steering column in the clamped position.

Other objects, advantages and novel features of the present invention will become apparent from the following detailed description of the invention when considered in conjunction with the accompanying drawings.

DETAILED DESCRIPTION OF THE DRAWINGS

Figure 1:
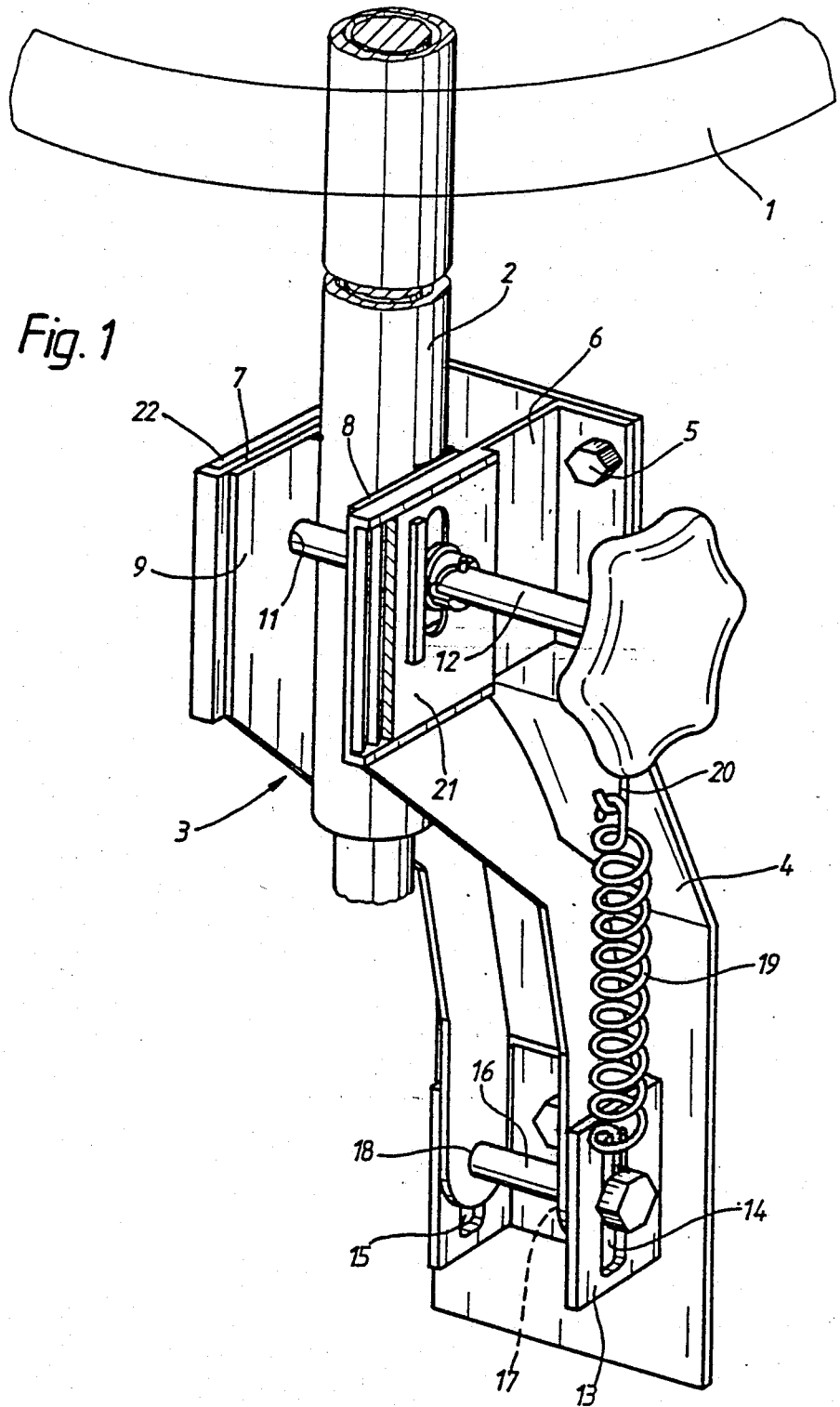
FIG. 1 is a schematic partial perspective view of a steering column receiving arrangement constructed in accordance with a preferred embodiment of the invention.

A steering wheel 1 that is only outlined in FIG. 1 is connected with a steering column 2 that at its other end interacts with a steering gear that is not shown.

In order to be able to adapt the height of the steering wheel and its inclination to the preferred position of the respective driver, the steering column 2 is adjustably disposed in a receiving arrangement 3. The receiving arrangement 3 is fastened at the vehicle via a bent metal sheet member 4 and has two receiving plates 6, 7 that are connected with this metal sheet 4 by means of screws 5, said receiving plates 6, 7 receiving the steering column 2 between one another.

For accommodating supporting thereof, the steering column 2 is welded together with two lateral bearing plates 8, 9. A steering column bearing shaft 12 reaches through the bores 10, 11 of the bearing plates 8, 9. Bearing shaft 12 is disposed to pass through receiving plates 6, 7. The bearing plates 8, 9 extend to another receiving means 13 having oblong holes 14, 15, into which a stud 16 slides that also extends through bores 17, 18 of the bearing plates 8, 9 and as a result guides said bearing plates 8, 9 along the oblong holes 14, 15 during adjustment movements.

In order to avoid a sliding of the steering column 2 caused by its own weight when the clamping is opened, this bearing plate area is also supported by a spring 19 that is held in a lug 20 at the sheetmetal member 4.

Figure 2:
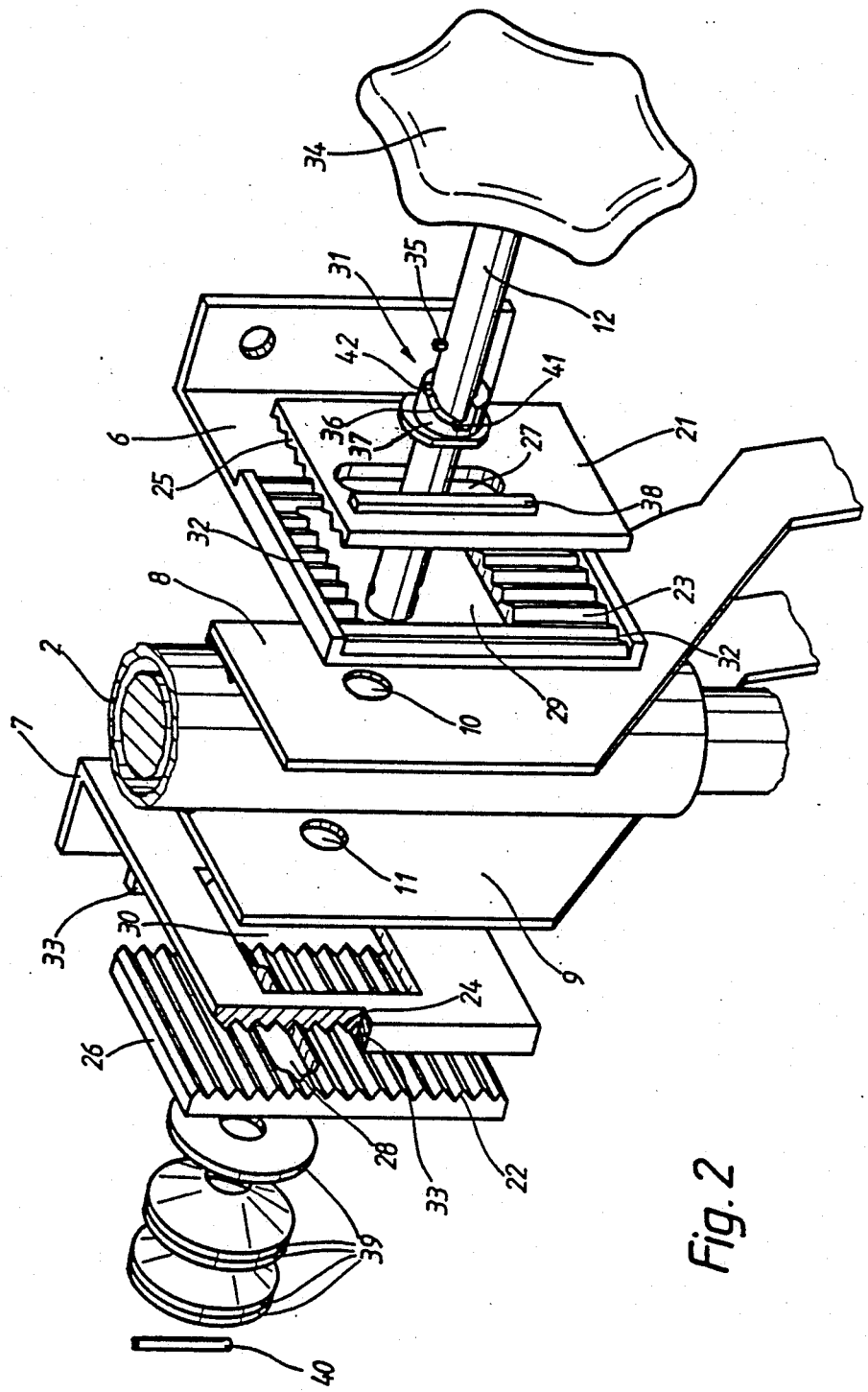
FIG. 2 is an exploded perspective view of the adjusting and clamping components of the receiving arrangement of FIG. 1.

FIG. 2 shows details of adjusting and clamping components of the receiving arrangement. A respective close-lying locking plate 21, 22 is assigned to each receiving plate 6, 7, with which it engages via a toothing 23, 24 that corresponds to a toothing 25, 26 of the locking plate 21, 22.

These toothings 23, 24, with their tooth profiles, extend in parallel to respective oblong holes 27, 28 in the close-lying locking plate 21, 22 and are offset with respect to one another in their longitudinal course by 90°. In the center of the receiving plates 6, 7, respective cutouts 29, 30 are located, the dimensions of which correspond to the maximally possible sliding path of the bearing shaft 12 in the oblong holes 27, 28 of the locking plates 21, 22.

During the adjustment of the height of the steering column 2, the steering column 2 is pulled upward or pressed downward after the clamping arrangement 31 is opened up, the bearing shaft 12, on one side, sliding in the oblong hole 27. In the process, the locking plate 21 by means of upper and lower guide surfaces 32, is held in position at the receiving plate 6.

On the opposite side, the toothing 26 of the locking plate 22 is transported by the operator's force over the toothing 24 of the receiving plate 7 and, after the force is no longer present, is locked in again.

When the inclination of the steering column 2 is adjusted, the steering column 2 is guided correspondingly in the transversely extending oblong hole 28, in which case the locking plate 22 is held by the guide surfaces 33. The locking plate 21 of the opposite side is moved over the toothing 23 of the receiving plate 6 and is locked again.

The final locking takes place by the actuating of the clamping arrangement 31. Clamping arrangement 31 comprises a twist grip 34 and a sliding pin 35 that slides along a curved path 36 of a body 37 that supports itself laterally against twisting at a guide 38. At the opposite end of the bearing shaft 12, the bearing shaft 12 receives several disk springs 39 that are held by a holding pin 40.

When the clamping is now released, the sliding pin 35 is located at the end point 41 of the curved path 37 close to the locking plate, and the disk springs 39, on the other side, in a released way, are located on the bearing shaft 12 so that with a low expenditure of force, the locking can be overcome and the steering column 2 can be slid.

For the locking of the steering column 2, the twist grip 34 is twisted so far that the sliding pin 35 comes to be located in the end point 42 of the curved path 36 that is the farthest away from the locking plate 21. As a result, the disk springs 39 are pulled toward the other locking plate 22 and braced, whereby the toothings 23 and 25, 24 and 26 are also pressed into one another, thus preventing a further sliding of the steering column.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A receiving arrangement for a steering column of a motor vehicle that carries the steering column by means of a bearing shaft at two receiving plates fixed at the vehicle at opposite lateral sides of the steering column, said steering column being adjustable in its inclination and height by movement of the bearing shaft along oblong holes and being lockable in different positions by means of a clamping arrangement, wherein a locking plate is assigned to each receiving plate, said locking plate having a respective oblong hole, each receiving plate containing a square cutout, the dimensions of which correspond to the maximum sliding path of the adjustment of the height and inclination, the receiving plates and the locking plates, at their surfaces facing one another, are equipped with toothings that engage with one another, the tooth profiles of said toothings each extending in the direction of the longitudinal course of the oblong hole of the adjacent locking plate.

2. A receiving arrangement according to claim 1, wherein each locking plate is aligned relative to its receiving plate by, means of guide surfaces that delimit the longitudinal course of its tooth profiles.

3. A receiving arrangement according to claim 2, wherein said guide surfaces are formed as bent away sections of the receiving plates.

4. A receiving arrangement according to claim 2, further comprising clamping means in the form of inter-engageable clamping track means at the bearing shaft and locking plate for accommodating forced axial movement of the bearing shaft in response to rotation of the bearing shaft.

* * * * *